May 26, 1953      G. M. ROTHROCK      2,640,049
PREPARATION OF ACRYLONITRILE/VINYLPYRIDINE POLYMERS
Filed March 2, 1948
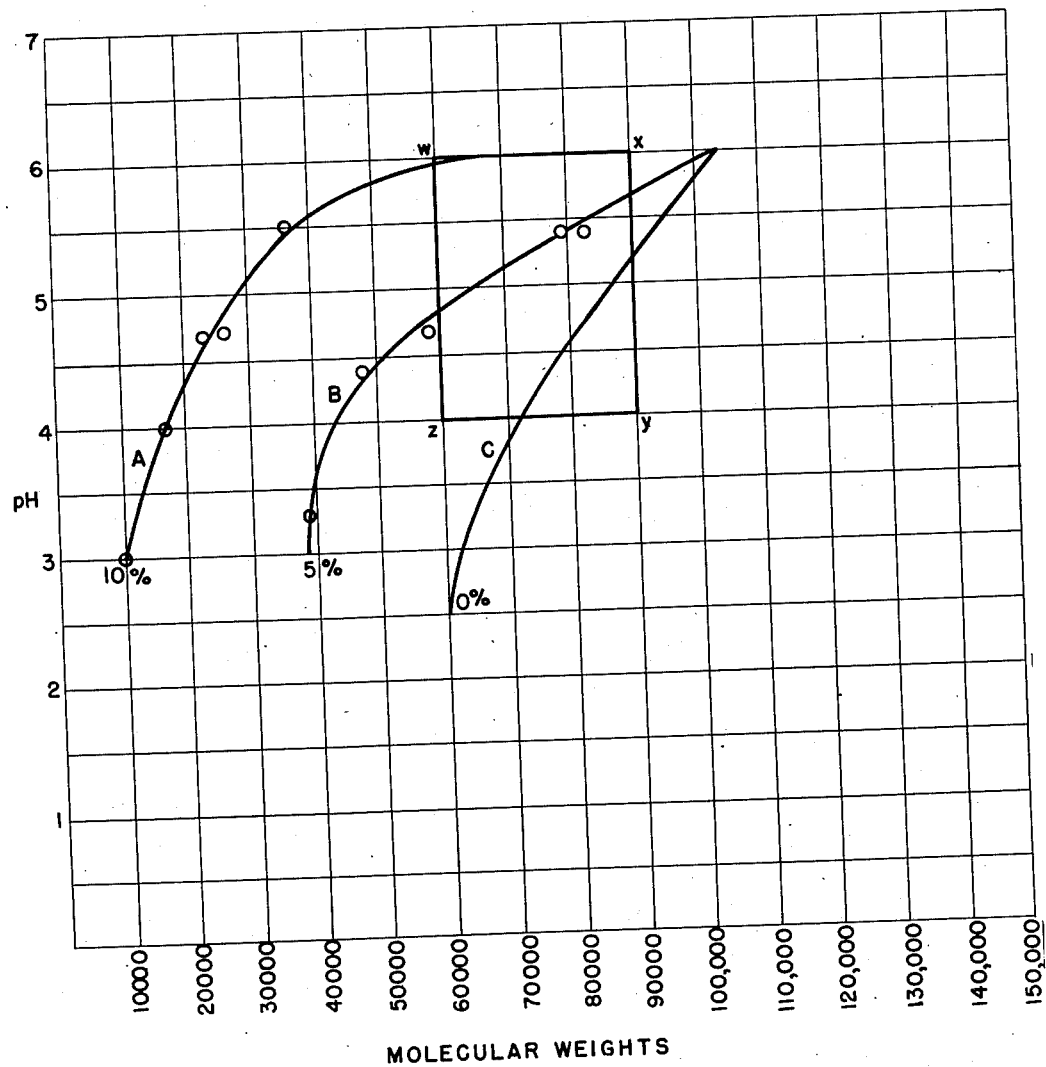
INVENTOR.
GEORGE MOORE ROTHROCK
BY C. H. Mortenson
ATTORNEY Patented May 26, 1953

2,640,049

UNITED STATES PATENT OFFICE 2,640,049

PREPARATION OF ACRYLONITRILE-VINYLPYRIDINE POLYMERS

George Moore Rothrock, Kenmore, N. Y., assignor to E. I. du Pont de Nemours & Company, Wilmington, Del., a corporation of Delaware Application March 2, 1948, Serial No. 12,508

13 Claims. (Cl. 260—85.5)

This invention relates to the preparation of useful polymers of acrylonitrile and more particularly to a process for polymerizing acrylonitrile and a vinylpyridine in an aqueous medium.

Polyacrylonitrile and copolymers and interpolymers of acrylonitrile with other polymerizable substances, for example vinyl or acrylic compounds, in which at least 85% by weight of the polymer is acrylonitrile, have been known for some time and recognized as possessing desirable physical and chemical properties, including toughness and insolubility in and insensitivity to common organic solvents. However, since acrylonitrile polymers containing a major portion of acrylonitrile are relatively insoluble, unreactive, and hydrophobic materials, the dyeing of structures prepared from such polymers is a difficult problem. Standard commercial dyeing techniques cannot be used satisfactorily; for example, only light shades are obtained on dyeing structures of polyacrylonitrile with dispersed acetate, basic, and certain vat colors.

While the dye receptivity of polyacrylonitrile can be improved to some extent by copolymerizing the acrylonitrile with other polymerizable substances such as styrene, acrylic acid, vinyl chloride or methyl vinyl ketone, the dyeable product no longer exhibits the desirable properties of polyacrylonitrile. This stems from the fact that ordinarily the polymer must contain 15 or more per cent of the other polymerizable material before it can be classed as a readily dyeable polymer. It has now been found that an acrylonitrile polymer containing as little as 2.0% of a vinylpyridine can be dyed readily with acid colors and with direct colors of relatively low molecular weight. This dye receptivity is enhanced with increasing amounts of vinylpyridine in the polymer. In fact, amounts up to 15% of vinylpyridine in the polymer can be tolerated. For dye receptivity and over-all properties, vinylpyridines are the most effective monomers hitherto known for polymerization with acrylonitrile.

Highly useful synthetic yarns can be prepared from these copolymers of acrylonitrile containing from 2% to 15% of a vinylpyridine by various dry- or wet-spinning techniques. It is preferred to dry-spin solutions of these copolymers in some of the lower boiling solvents described in U. S. Patents 2,404,714 to 2,404,727, inclusive, for economic reasons. The spinnability of a polymer solution naturally depends upon the temperature and viscosity of the solution and also upon the uniformity of the polymer from the standpoint of molecular weight distribution and structure. For good spinnability a polymer should be substantially linear. Branching in the polymer chain affects the solution characteristics of the polymer and the way in which a concentrated solution of the polymer passes through a small orifice, as in a spinneret. Likewise, the size of the polymer molecules should be uniform and should be predetermined to give a balance between good spinnability and maximum physical properties. A broad molecular weight distribution leads to non-uniform spinning and physical properties. For the dry-spinning of polyacrylonitrile yarns from solutions of the polymer in dimethyl formamide, for example, a polymer average molecular weight, as calculated from its viscosity and Staudinger constant, ranging from about 60,000 to 90,000, is necessary to give the proper balances between good spinnability and maximum physical properties. This preferred average molecular weight of 60,000 to 90,000 may be obtained by blending batches of polymer having molecular weights considerably higher and lower than these predetermined limits. However, if a fraction having an average molecular weight of 100,000 or greater is used in this blending procedure, the spinnability of the blend becomes progressively worse as the molecular weight of the fraction increases. In fact, blends containing fractions of 184,000 molecular weight could not be dry-spun even though the solutions were homogeneous to visual observations. However, to obtain yarns having maximum physical properties, the average molecular weight of the acrylonitrile polymer should be at least 60,000.

Further, the copolymerization of vinylpyridine and acrylonitrile is not achieved readily and when known methods involving peroxy type catalysts are used, unsatisfactory products are obtained. With benzoyl peroxide catalysts in bulk or in an inert organic solvent, small yields of soft, dark colored products are usually formed. These appear from nitrogen analyses to be chiefly polyvinylpyridine. In emulsion systems at the high pH values (above 8) normally required for satisfactory emulsion polymerization of vinylpyridine, copolymers can be obtained in all proportions in the presence of a water-soluble persulfate as the sole catalyst, but the molecular weight of the product cannot be controlled to yield a polymer product satisfactory for dry-spinning as defined above. In the presence of activated persulfate catalysts at a pH of 6 and above, the reaction is so erratic that often no polymer is obtained.

Consequently, an object of this invention is to provide a new method for polymerizing acrylonitrile and vinylpyridine. A further object is to provide a method for polymerizing acrylonitrile and a vinylpyridine in aqueous solution and in the presence of a polymerization catalyst. A still further object is to provide a polymerization method which will consistently yield a polymer having a uniform molecular weight. A still further object of this invention is the production of acrylonitrile/vinylpyridine polymers containing at least 85% acrylonitrile and having an average molecular weight of between 10,000 and 100,000. Still another object of the invention is the continuous production of these preferred polymers having an average molecular weight of between 60,000 and 90,000. A still further object is to provide a readily dyeable acrylonitrile polymer which is eminently suited for the production of high tenacity yarns by standard dry-spinning techniques. Other objects will appear hereinafter.

The objects of this invention are accomplished by polymerizing monomer mixtures of acrylonitrile and a vinylpyridine which mixtures contain at least 85% of acrylonitrile, the polymerization being conducted in an aqueous solution, in the presence of a polymerization catalyst and at a pH not exceeding 6, as, for example, from 4.0 to 5.9. The maintenance of the pH as described has a profound effect on the molecular weight of the product obtained. Thus, the highest molecular weight products are obtained by maintaining the pH of the polymerization mixture as close to 6 as possible. Progressively lowering the pH leads to progressively lower molecular weight polymers. Further, the amount of vinylpyridine monomer, based on the total amount of polymerizable monomers, present in the polymerization mixture affects the molecular weight of the product. For example, in the aqueous solution polymerization of acrylonitrile and a vinylpyridine in the presence of a sulfoxy activated persulfate catalyst and at a given maintained pH below 6, increasing the proportion of the vinylpyridine results in the production of progressively lower molecular weight products. In the preferred process of this invention acrylonitrile and between 2 and 8 per cent of a vinylpyridine, based on the total amount of polymerizable monomers, are dissolved in an aqueous solution made to a pH of 4.0 to 5.9 and the monomers are polymerized in the presence of a polymerization catalyst while maintaining the pH of the mixture between 4.0 and 5.9. In this preferred process it is preferred to use 2-vinylpyridine and an activated persulfate catalyst. The copolymer precipitates in finely divided state as it forms and after filtering and washing it is eminently suited for the preparation of solutions by the slurry technique described in Finzel U. S. 2,404,728.

The invention will be more clearly understood by referring to the examples and discussion which follow. The figure graphically shows the control of the polymerization to give uniformity in molecular weights. The following examples, in which parts and percentages are by weight unless otherwise specified, are given for illustrative purposes and are not to be considered limitative.

EXAMPLE I

The utility of this invention for preparing these copolymers having a predetermined molecular weight by a continuous polymerization process can be shown in the following example:

A reaction kettle was charged with 1,870 parts of water and heated to 44° C. A constant pressure of nitrogen was maintained above the liquid level by allowing the gas to bubble slowly out of a water seal on an attached condenser. When the water reached 44° C., the following reactants were added:

| | Parts |
|---|---|
| Acrylonitrile monomer | 120 |
| Ammonium persulfate (0.5% based on the monomer) | 0.6 |
| Sodium metabisulfite (1.0% based on the monomer) and enough 2 N sulfuric acid to bring the pH of the mixture to 3.0 | 1.2 |

With constant mechanical agitation the reaction mixture became cloudy in five to ten seconds. After 45 minutes of batch reaction, the various reactants were metered-in to the polymerizer at rates adjusted to keep the concentrations of the reactants constant at the above ratios throughout the reaction. The pH of the slurry in the kettle was measured periodically and kept in the range 3.0–3.3 by adding appropriate amounts of aqueous acid or base. As the additional reactants were added to the kettle, the slurry of polymer in the kettle was allowed to overflow and was continuously filtered. The addition of reactants and the corresponding slurry overflow was adjusted to pass a charge of 2,000 parts of material through the kettle every 71.5 minutes. Also, 70 to 100 parts samples of slurry were weighed and filtered. The collected polymer was washed with water and acetone, then dried at 80° C. and weighed to determine monomer conversion. The dried polymer thus obtained was used for molecular weight determination. When the polymerization had reached equilibrium, the monomer feed was changed from 100% acrylonitrile to 95% acrylonitrile and 5% 2-vinylpyridine. The pH of the reaction mixture was adjusted to 5.3 and maintained in the range 5.2–5.6 by adding dilute sulfuric acid as needed. Seven hours after the mixed monomer feed was begun, equilibrium was reached and the following table shows the constancy of the molecular weight of the product that can be obtained by maintaining a constant pH during the reaction.

*Table I*

| Time from Equilibrium | pH | Molecular Weight |
|---|---|---|
| 0 | 5.3 | 85,000 |
| 3 hours | 5.35 | 81,500 |
| 8 hours | 5.43 | 80,000 |
| 18 hours | 5.20 | 82,000 |
| 28 hours | 5.50 | 85,500 |
| 40 hours | 5.32 | 84,000 |

A 2% solution of this polymer was prepared in dimethyl formamide. No permanent precipitate appeared upon the addition of 10 drops of concentrated sulfuric acid to 10 milliliters of the solution. If any of the homopolymer, polyvinylpyridine, were present, a precipitate would immediately appear.

After filtering the slurry samples, the filtrate was titrated electrometrically with standard acid to determine the amount of residual vinylpyridine monomer. From this information and the conversion data, the amount of vinylpyridine in the copolymer was calculated. Thus, the polymer formed in the above experiment was found to contain 6% vinylpyridine.

A 17.5 solution of this polymer was prepared in dimethyl formamide by the method described in Finzel U. S. 2,404,728. This solution was dry-spun into continuous filament yarn, which after drawing eight times its original length, then relaxing 15% had a tenacity of 3.5 grams per denier and an elongation of 15%. The spinning continuity was excellent and the physical properties of the yarn were substantially uniform along the lengths of the yarn. A skein of this yarn was placed in a boiling aqueous bath containing 1,5-diamino - 4,8 - dihydroxyanthraquinone - 3-sulfonic acid dyestuff. The yarn was dyed a heavy shade of blue, whereas an unmodified polyacrylonitrile yarn remained white.

EXAMPLE II

A series of continuous polymerizations was performed using 95% acrylonitrile and 5% 2-vinylpyridine as the monomer mixture, each reaction being carried out at a different constant pH. The continuous polymerizations were started as a batch polymerization using:

| | Parts |
|---|---|
| Water | 1754 |
| Acrylonitrile | 143 |
| 2-vinylpyridine | 7.5 |
| Ammonium persulfate | 0.83 |
| Sodium metabisulfite | 1.66 |
| $2NH_2SO_4$ | 6.25 |

The pH of this mixture was 5.1. After one hour at 45° C. the pH was 4.3. At this time, the reactants were added continuously as follows:

2.8 parts/min. of the 95/5 acrylonitrile/2-vinylpyridine mixture
11.1 parts/min. of a 0.27% aqueous solution of sodium metabisulfite
11.1 parts/min. of a 0.135% aqueous solution of ammonium persulfate The addition of reactants and the corresponding slurry overflow was adjusted by this means to pass a charge of 2000 parts of material through the vessel every 80 minutes. The pH was maintained at a different constant level in each run by continuously adding the necessary amounts of aqueous acid or base. The results of four such experiments are given in Table II.

Table II

| pH | Molecular Weight |
|---|---|
| 3.3 | 39,000 |
| 4.4 | 48,000 |
| 4.7 | 58,000 |
| 5.4 | 69,000 |

EXAMPLE III

Duplicate polymerizations were carried out in vessels which were agitated in a water bath at 45° C. for 3 hours. The following ingredients were used:

| | Parts |
|---|---|
| Distilled water | 242 |
| Total monomer | 18 |
| Ammonium persulfate (0.5% based on the monomer) | 0.09 |
| Sodium metabisulfite (1% based on monomer) | 0.18 |

The total monomer in each case was composed of 90% acrylonitrile and 10% 2-vinylpyridine. The pH of each sample was varied, being adjusted at the start by adding dilute sulfuric acid until the pH was the desired value.

After 3 hours the product was filtered, washed with distilled water and dried in an oven for eight hours at 80° to 85° C. The molecular weight of the polymer product in each case was determined from the viscosity of dimethyl formamide solutions of the polymer with the aid of the Staudinger equation. The results of these experiments are tabulated in Table III, which shows the effect of pH on the molecular weight of the polymer product obtained.

Table III

| pH | Molecular Weight |
|---|---|
| 2.0 | 8,000 |
| 3.0 | 10,000 |
| 4.0 | 17,000 |
| 4.7 | 23,000 |
| 5.5 | 36,000 |
| 6.0 | 132,000 |

EXAMPLE IV

The procedure for Example III was repeated, using no sulfoxy type activator. The recipe was as follows:

| | Parts |
|---|---|
| Water | 239 |
| Acrylonitrile (95% based on total monomer) | 17.1 |
| 2-vinylpyridine (5% based on total monomer) | 0.9 |
| Ammonium persulfate (1% based on monomer) | 0.18 |

The results shown in Table IV indicate that the same relative effect is obtained in the absence of the sulfoxy activator.

Table IV

| pH | Molecular Weight |
|---|---|
| 3.0 | 24,000 |
| 5.0 | 41,000 |
| 7.4 | 120,000 |

EXAMPLE V

In a glass vessel equipped with a stirrer and condenser, and containing 15,000 parts of distilled water through which nitrogen had been bubbled, there were placed 3 parts of a sodium sulfate of an aliphatic hydrocarbon of about 15-18 carbons, 712.5 parts of acrylonitrile, 37.5 parts of 2-vinylpyridine, and 15 parts of alpha,alpha'-azodiisobutyronitrile. The polymerizable monomers contained 95% of acrylonitrile and 5% of vinylpyridine. Three experiments were performed, adjusting the pH of the mixture at 7.0, 7.1 and 4.55 respectively by adding dilute sulfuric acid. The vessel and contents were heated in a bath at 65–70° C. for 15½ hours with agitation. The polymer was coagulated by adding 200 parts of a water solution containing 10% of aluminum sulfate; the precipitate was filtered, washed with distilled water and acetone, and dried. There was obtained in each case about 75% yield of copolymer, containing 5% 2-vinylpyridine and 95% of acrylonitrile. Yarn was obtained from the copolymer by dry-spinning a dimethylformamide solution. The yarn had excellent dyeability with acid dyes, whereas an acrylonitrile polymer similarly prepared in the absence of vinylpyridine did not dye with acid dyes. The effect of pH on molecular weight is shown in Table V.

Table V

| pH | Molecular Weight |
|---|---|
| 7.0 | 59,000 |
| 7.1 | 55,000 |
| 4.55 | 21,000 |

EXAMPLE VI

Duplicate polymerizations were carried out in glass vessels which were agitated in a water bath at 40° C. for 19 hours. The following ingredients were used:

| | Parts |
|---|---|
| Distilled water | 242 |
| Acrylonitrile | 17.1 |
| 2-methyl-5-vinylpyridine | 0.9 |
| Ammonium persulfate (2% based on total monomer) | 0.36 |
| Sodium metabisulfite (1% based on total monomer) | 0.18 |

The pH of each sample was adjusted at the start by adding dilute hydrochloric acid. Each polymerization was started at a different pH.

After 19 hours the product was filtered, washed with distilled water, and dried in a vacuum oven for 8 hours at 80° to 85° C. The results of these polymerizations are shown in Table VI.

Table VI

| pH | Molecular Weight |
|---|---|
| 3.0 | 18,000 |
| 4.0 | 17,000 |
| 5.0 | 29,000 |
| 5.5 | 33,000 |
| 6.0 | 45,000 |

Films of these polymers cast from dimethyl formamide had excellent dyeability with acid and direct dyestuffs while unmodified polyacrylonitrile films remained uncolored.

The results of Experiments I, II, and III are graphically shown in the figure, in which molecular weight is plotted against pH at various concentrations of 2-vinylpyridine monomer. Curve A was plotted from the data of Experiment III in which 10% 2-vinylpyridine was polymerized with 90% acrylonitrile at various pH levels. Curve B was similarly taken from the data of Experiments I and II where 5% 2-vinylpyridine was used. Curve C was plotted from data obtained from similarly conducted continuous polymerizations of acrylonitrile in the absence of any other polymerizable monomer. The area encompassed by the rectangle $wxyz$ illustrates the pH and 2-vinylpyridine monomer concentration conditions that can be used to prepare copolymers having a molecular weight in the preferred range 60,000 to 90,000. These curves, A, B and C, permit interpolation for any vinylpyridine monomer concentration between 0 and 10%.

When a sulfoxy activated persulfate catalyst is used, it has been found that the pH of the reaction mixture, the per cent vinylpyridine based on total monomer and the molecular weight of the copolymer product are inter-related by the following equation:

$$pH = (0.6 - 5 \times 10^{-6} M.W.) VP + 5.85 \times 10^{-5} M.W. - 0.28$$

wherein pH represents the pH of the polymerization mixture, VP represents the per cent 2-vinylpyridine in the monomer mixture and M. W. represents the average molecular weight of the polymer product. Thus, the equation can be used to determine what polymerization conditions must be used to obtain a readily dyeable copolymer of acrylonitrile and 2-vinylpyridine having a specific, predetermined molecular weight. The equation is particularly accurate for the preparation of copolymers containing from 2% to 8% 2-vinylpyridine and having molecular weights in the range 60,000 to 90,000. To obtain copolymers having a specific molecular weight within this range, the pH control must be accurate to no more than 4%. In other words, as seen in Figure 1, in order to prepare a copolymer containing 5% vinylpyridine monomer and 95% acrylonitrile monomer and having an average molecular weight of 70,000 plus or minus 3,000, which is about the limit of accuracy of molecular weight determination by the viscosity method, one must keep the pH of the reaction mixture constant at 5.15 and certainly between the range 4.9 and 5.4. Since at low pH values, i. e. below 4, the molecular weight of the product does not change rapidly with changing pH, the control at low pH's is much more flexible. Using this sulfoxy activated persulfate polymerization process at low pH values, the molecular weight of the product is more dependent upon the vinylpyridine content of the monomer mixture. When this vinylpyridine monomer content exceeds 5%, only relatively low molecular weight products are obtained at the low pH's. In fact, to obtain polymers having a molecular weight in the preferred range of 60,000 to 90,000, the vinylpyridine content of the monomer should not exceed about 9% and preferably should not be more than 8%.

On the other hand, at pH values of 6 or above very little, if any, polymerization takes place in the presence of a sulfoxy activated persulfate catalyst, the reaction being erratic. The yield of polymer is generally low, being of the order of 15% or less, and there are indications that the product contains considerable portions of polyvinylpyridine homopolymer.

Examples IV and V show that the molecular weights of these preferred copolymers can be controlled by controlling the pH of the reaction mixture when other catalyst systems are used. The pH limits and range of vinylpyridine monomer concentrations, suitable for preparing readily dyeable copolymers of vinylpyridine containing at least 85% by weight of acrylonitrile, vary with the polymerization catalyst system employed. However, it is obvious that these limits can be readily determined and the principle of this invention may be used in the preparation of preferred copolymers having a predetermined desirable molecular weight.

The average molecular weights described in this invention were obtained from viscosity data by using the Staudinger equation as shown below:

$$\text{Molecular weight} = \frac{N_{sp}}{K_m C}$$

wherein:

$$K_m = 1.5 \times 10^{-4}$$

$$N_{sp} = \text{specific viscosity} = \frac{\text{viscosity of solution}}{\text{viscosity of solvent}} - 1$$

and $C$ = concentration of the solution expressed as the number of mols of monomer (calculated) per liter of solution.

Using very dilute solutions for the viscosity measurements, the molecular weight values obtained by this method are probably accurate to about 4% or better.

While in most vinyl polymerizations the amount of catalyst used affects the molecular weight of the product obtained, experiments performed in defining the limits of this invention indicate that the process described herein is relatively free of this effect. It was found that the catalyst concentration could be varied over wide limits without appreciably affecting the molecular weight of the copolymer product. When using vinylpyridine monomer in amounts exceeding 5% of the total monomer, it will be found that the polymer yield increases with catalyst concentration but the molecular weight of the product is unaffected. In a series of experiments in which all other conditions were kept constant, the catalyst concentration was varied between 0.10 and 3%. No significant differences in molecular weights were noted. The catalyst may be any water-soluble derivative of perdisulfuric acid such as sodium, potassium, lithium, barium, magnesium, calcium and ammonium perdisulfate, alone or in conjunction with an activator; an azo compound of the type disclosed in Hunt Serial No. 2,551, now Patent 2,471,959, filed January 15, 1948; or other free radical formers, such as the peroxides.

Although, as demonstrated in Example IV, activators are not essential to the process of this invention, generally it is preferred to use activators with the peroxy-type catalyst because they shorten the time of reaction. The preferred compounds for activating persulfate catalysts are the water-soluble oxidizable sulfoxy compounds in which the valence of a sulfur atom does not exceed 4. Compounds of this type, which can be used in this reaction, include sodium bisulfite, sodium metabisulfite, sulfur dioxide, sodium hydrosulfite, sodium thiosulfate, diethylsulfite, formamidine sulfinic acid and p-toluene sulfinic acid. The concentration of the activator employed may be varied within wide limits. For example, amounts of activators varying from 0.001% to 5% of the quantity of monomer employed are operable. The preferred proportion of activator lies in the range of 0.25% to 2.0% based on the weight of monomer. In addition, the average molecular weight of the copolymer product does not seem to be affected by the ratio of sulfoxy activator to catalyst. In other words, more catalyst than activator may be used or vice versa without appreciably affecting the average molecular weight of the products obtained.

Copolymers of acrylonitrile and vinylpyridine which can be prepared by the process of this invention include those from the alpha-, beta- or gamma-vinylpyridines and homologs thereof containing an alkyl radical of one to four carbon atoms attached to an angular carbon atom of the pyridine ring, as shown by Example VI. Because of their accessibility it is preferred to employ a vinylpyridine containing not more than nine carbon atoms. These include alpha-, beta- and gamma- vinylpyridines and their methyl and ethyl ring substitution products as, for example, 5-ethyl-2-vinylpyridine. Mixtures of two or more of the herein disclosed vinylpyridines can be used in the copolymerization with acrylonitrile if desired.

The molecular weight of the copolymer products will vary with the specific vinylpyridine employed. This variance is caused by the different relative reactivities of the vinyl group; according to the position on the pyridine ring. The reactivity of the vinyl group is probably affected also by other substituent groups attached to the pyridine nucleus. It will be obvious to one skilled in the art that the invention described herein can be used to prepare copolymers of acrylonitrile, having a specific predetermined molecular weight, with other vinylpyridines than 2-vinylpyridine. The limits set up herein for 2-vinylpyridine will not necessarily apply when preparing copolymers of acrylonitrile with 3-vinylpyridine or 4-vinylpyridine. By this invention the pH limits and range of vinylpyridine monomer contents suitable can be readily determined and the principle of this invention may be used in the preparation of preferred copolymers having a predetermined desirable molecular weight. However, the same general limitation will apply. For example, very little, if any, polymerization will be obtained with a sulfoxy activated persulfate catalyst when a pH above 6 is used. In addition, at pH's below 4, the molecular weight of the product will be affected much more by the concentration of the vinylpyridine monomer used than by the pH of the polymerization system. The highest molecular weight will be obtained at high pH's and using relatively low concentrations of the vinylpyridine monomer.

The process of this invention is capable of being operated at either room temperature or at slightly elevated temperature, for example from 20° to 100° C. Preferably, however, the process is operated at a temperature within the range of from 20° to 50° C. and under an atmosphere of an inert gas. The inert medium may be selected from a large number of materials including nitrogen, air, carbon dioxide, methane or helium. While air may be used as the inert gas, it usually is preferred to displace the air with a gas such as nitrogen, since greater control over the polymerization is attained. Likewise, the process is not limited to any particular apparatus. Suitable vessels include those constructed of stainless steel, aluminum, nickel, silver or lead. Vessels equipped with glass or enamel liners may also be used. Particularly advantageous are aluminum vessels or vessels lined with aluminum because the accumulation of polymer scale on the walls of the reactors is extremely small. The examples have shown the use of aqueous solutions in the polymerizations. The invention is not limited thereto and aqueous mixtures, in general, may be employed. For example, aqueous dispersions prepared using any of the well-known dispersing agents may be used in the polymerizations of this invention.

The time of batch polymerization may be varied over wide limits. As shown in Example II, the reaction may be completed in 3 hours. Actually, shorter times or longer times may be employed. The time may be varied from 1.5 to 90 hours, although shorter times, e. g. 3 hours, gives best molecular weight control. In practice, the process is carried out continuously using cycles, for example, of 40–80 minutes.

When acrylonitrile comprises 85% or more of the monomer mixture, the polymer product precipitates in finely divided form as soon as it is formed. The production of such polymers can, therefore, be carried out readily on a continuous basis. Once the reaction has started, the ingredients can be metered-in continuously, while allowing the contents of the reactor to drain-off through an overflow pipe. The polymer product can be continuously filtered, washed and dried.

Fibers, filaments, and yarns prepared from polymers containing from 85% to 98% acrylonitrile and from 2% to 15% of a vinylpyridine can be readily dyed by standard commercial techniques with acid and direct dyestuffs of relatively low molecular weight. In contrast to articles prepared from 100% polyacrylonitrile, these preferred copolymers are dyed to highly acceptable shades with such dyestuffs as 1,5-diamino-4,8-dihydroxyanthraquinone-3-sulfonic acid, 1-aminonaphthalene-4-sulfonic acid→1-hydroxynaphthalene-4-sulfonic acid, Pontamine Sky Blue 6BX (Color Index No. 518), Pontacyl Light Yellow GG (Color Index No. 636), 2-hydroxynaphthalene-6, 8-disulfonic acid←benzidine→phenol+p-tolyl sulfonyl chloride, Du Pont Orange RO (Color Index No. 161), Du Pont Azo Eosin G (Color Index No. 114), Pontachrome Fast Red E (Color Index No. 652), as listed in the Color Index along with many other similar acid and direct dyestuffs. In addition, these copolymers possess greater affinity for dispersed acetate and vat colors. These readily dyeable articles containing as little as 2.0% and as much as 15% of a vinylpyridine retain the desirable properties of 100% polyacrylonitrile, including toughness and insensitivity to common organic solvents, as, for example, those used in dry cleaning practices.

Thus, the process of this invention can be used to prepare copolymers of vinylpyridine with acrylonitrile having molecular weights between 10,000 and 100,000, using minor proportions of vinylpyridine in the monomer mixture. It is especially useful in preparing homogeneous copolymers of acrylonitrile and 2-vinylpyridine containing minor amounts of the latter, having a predetermined molecular weight in the range of 60,000 to 90,000. These copolymers, as previously stated, are readily dyeable, particularly with acid type dyestuffs, and can be readily dry-spun into useful yarns having desirable tensile and elongation properties and resistance to weathering and common organic solvents, such as used in dry cleaning. The process can be especially adapted to economical continuous polymerization techniques as shown in Example I. The continuous process is also preferred because it results in maximum homogeneity of the copolymer products.

When the molecular weight of these copolymers falls much below 60,000, filaments and yarns can be prepared from them, but their tensile properties are inferior to those of the higher molecular weight products. These lower molecular weight copolymers of acrylonitrile and vinylpyridine are quite useful, however, in coating compositions and as sizes for yarns, fabrics and the like.

Ordinary polymerization equipment can be used in carrying out the process of this invention. In addition, the copolymer products precipitate readily from the reaction mixture in finely divided form suitable for the preparation of solutions in the volatile organic solvents described in U. S. 2,404,714 to U. S. 2,404,727 inclusive. Further, the products prepared by the process of this invention can be used directly in wet or dry spinning or casting techniques without the use of intermediate, costly steps such as the extraction of polymeric aggregates of unsuitable molecular weights.

Any departure from the above description which conforms to the present invention is intended to be included within the scope of the claims.

I claim:
1. A process for continuously polymerizing monomers comprising acrylonitrile and a vinylpyridine to polymers of a controlled molecular weight which process comprises continuously dissolving acrylonitrile and from 2% to 8% of said vinyl pyridine, based on the total amount of said monomers, in an aqueous solution containing a polymerization catalyst and having a pH not exceeding 6 upon which said molecular weight is dependent and polymerizing said monomers in said solution while continuously adding acid to said solution to maintain said pH substantially constant.

2. A process in accordance with claim 1 wherein said molecular weight is between 10,000 and 100,000.

3. A process in accordance with claim 1 wherein the said molecular weight is between 60,000 and 90,000.

4. A process in accordance with claim 1 wherein the said vinylpyridine is 2-vinylpyridine.

5. A process for continuously polymerizing monomers comprising acrylonitrile and a vinylpyridine to polymers of a controlled molecular weight wheih process comprises continuously dissolving acrylonitrile and from 2% to 8% of said vinylpyridine, based on the total weight of said monomers, in an aqueous solution containing a polymerization catalyst and having a pH of from 4.0 to 5.9 and polymerizing said monomers in said solution while continuously adding an acid to said solution to maintain said solution at a substantially constant pH which is between 4.0 and 5.9.

6. A process in accordance with claim 5 in which said molecular weight is between 10,000 and 100,000.

7. A process in accordance with claim 5 in which said molecular weight is between 60,000 and 90,000.

8. A process in accordance with claim 5 in which the said vinylpyridine is 2-vinylpyridine and said catalyst is alpha,alpha'-azodiisobutyronitrile.

9. A process for continuously polymerizing monomers comprsing acrylonitrile and 2-vinylpyridine to polymers of a controlled molecular weight which process comprises dissolving acrylonitrile and from 2% to 8% of said vinylpyridine, based on the total weight of said monomers, in an aqueous solution containing a polymerization catalyst and having a pH of from 4.0 to 5.9 and polymerizing said monomers in said solution while continuously adding acid to maintain said solution at a substantially constant pH which is between 4.0 and 5.9.

10. A process in accordance with claim 9 in which said catalyst is a water-soluble perdisulfate.

11. A process in accordance with claim 9 in which said catalyst is a water-soluble perdisulfate and said molecular weight is between 10,000 and 100,000.

12. A process in accordance with claim 9 in which said catalyst is a water-soluble perdisulfate and said molecular weight is between 60,000 and 90,000.

13. A process for controlling between 60,000 and 90,000 the molecular weight of polymers prepared from monomers comprising acrylonitrile and 2-vinylpyridine which comprises continuously dissolving acrylonitrile and from 2% to 8% of said vinylpyridine, based on the total weight of said monomers, in an aqueous mixture adjusted to a pH of from 4.0 to 5.9 and polymerizing said monomers in the presence of a water-soluble perdisulfate and an oxidizable sulfoxy compound containing a sulfur atom having a valence not exceeding four while adding acid to said mixture to maintain said mixture at a substantially constant pH which is between 4.0 and 5.9.

GEORGE MOORE ROTHROCK.

References Cited in the file of this patent

UNITED STATES PATENTS

| Number | Name | Date |
|---|---|---|
| 2,436,926 | Jacobson | Mar. 2, 1948 |
| 2,456,360 | Arnold | Dec. 14, 1948 |
| 2,471,959 | Hunt | May 31, 1949 |
| 2,486,241 | Arnold | Oct. 25, 1949 |
| 2,491,471 | Arnold | Dec. 20, 1949 |
| 2,496,222 | Kolvoort et al. | Jan. 31, 1950 |

FOREIGN PATENTS

| Number | Country | Date |
|---|---|---|
| 597,368 | Great Britain | Jan. 23, 1948 |